United States Patent [19]
Ayanoglu et al.

[11] Patent Number: 5,394,437
[45] Date of Patent: Feb. 28, 1995

[54] HIGH-SPEED MODEM SYNCHRONIZED TO A REMOTE CODEC

[75] Inventors: Ender Ayanoglu, Atlantic Highlands; Nuri R. Dagdeviren, Red Bank; James E. Mazo, Fair Haven; Burton R. Saltzberg, Middletown, all of N.J.

[73] Assignee: AT&T Corp., Murray Hill, N.J.

[21] Appl. No.: 963,539

[22] Filed: Oct. 20, 1992

[51] Int. Cl.⁶ .............................................. H04B 1/38
[52] U.S. Cl. ..................... 375/222; 370/103; 341/144; 341/145; 375/350; 375/354; 375/356
[58] Field of Search .................... 375/8, 13, 107, 108, 375/106, 99, 11, 18, 7, 111, 101, 103; 341/61, 126, 144, 155; 370/32, 103

[56] References Cited

U.S. PATENT DOCUMENTS

| | | | |
|---|---|---|---|
| 4,890,303 | 12/1989 | Bader | 375/107 |
| 5,184,347 | 2/1993 | Farwell et al. | 375/107 |
| 5,214,637 | 5/1993 | Sridhar et al. | 375/8 |
| 5,261,118 | 11/1993 | Vanderspool, II et al. | 375/107 |
| 5,268,929 | 12/1993 | Hashimoto et al. | 375/13 |

Primary Examiner—Stephen Chin
Assistant Examiner—Amanda T. Le
Attorney, Agent, or Firm—Henry T. Brendzel

[57] ABSTRACT

A modem that operates reliably at a symbol rate that corresponds to twice its bandwidth even when it is coupled to a receiving A/D converter that operates under control of a clock is realized by synchronizing the modem's operation to the A/D's clock. The superior operation of this modem advantageously extends to A/D clock frequencies beyond the frequency of twice the modem's bandwidth. To minimize quantization noise, the modem's output is conditioned to minimize intersymbol interference by adjusting the modem's output to the A/D converter's sampling times and slicing levels. When the A/D's clock is higher than twice the bandwidth of the modem's output signal, some intersymbol interference cannot be avoided. In accordance with this invention, the position and value of this interference is computed at the receiver and subtracted from the received signal.

16 Claims, 4 Drawing Sheets

HIGH-SPEED MODEM SYNCHRONIZED TO A REMOTE CODEC

BACKGROUND OF THE INVENTION

This invention relates to transmission of digital information over an analog medium in tandem with a digital network and, more particularly, this invention relates to high-speed modems.

U.S. Pat. No. 4,924,492, issued May 8, 1990, describes a number of approaches for transmitting digital information over an analog transmission medium. To summarize, it describes a number of techniques for combining bits in a signal stream into digital words, converting those words into symbols, associating an analog signal with each symbol, and combining the analog signals to form a contiguous signal that is transmitted over an analog transmission medium. For example, with 3-bit coding, which corresponds to 8 levels and a symbol rate of 160,000 symbols per second, a PAM baseband signal of 80 kHz bandwidth can provide passage to a digital signal of 480 kb/s rate.

In connection with the T1 carrier system and an associated D channel bank (such as the D4 channel bank system offered by AT&T), voiceband channels are digitized and multiplexed to form a single 1.544 Mb/s stream. Specifically, each 3.5 kHz channel is sampled with an 8 kHz clock, and each sample is resolved into one of 256 levels that are represented by 8 bits, resulting in a 64 kb/s rate. Twenty four such channels of 64 kb/s each are combined with framing and other control bits to form a 1.544 Mb/s stream.

In the modem art where signals are restricted to voiceband channels, it has generally been accepted that the channel capacity is in the range of 30 kb/s, assuming a nominal bandwidth of between 3 to 3.5 kHz and a signal-to-noise ratio of about 30 dB. This is based on Shannon's classical work.

In the past 40 years, much progress has been made toward achieving modem data rates that approach this capacity. For example, 19.2 kb/s transmission is now possible over such voiceband channels.

On first blush it may appear that 19.2 kb/s is already close enough to the Shannon limit that sizeable improvement over this number would be very difficult to achieve. Doubling this amount would be practicably out of the question. Yet, the D channel bank provides a capacity that nominally is 64 kb/s. (Actually the capacity is not quite 64 kb/s because some capacity is allocated to signaling and line coding restrictions.)

To state the obvious, 64 kb/s communication over a subscriber line that has not been limited to 3.5 kHz band is doable, as demonstrated, for example, in the aforementioned U.S. patent. The need, however, is not merely to transmit at or near 64 kb/s but, to do so in a voiceband channel in a manner that allows coupling of the developed signal to the D channel bank. Stated in other words, there is a need for a modem whose analog output can be fashioned so well that the D/A converter in the modem and the A/D converter in the channel bank contribute no degradation.

SUMMARY OF THE INVENTION

Disclosed is a modem that operates reliably at a symbol rate (e.g., 7 kHz) that corresponds to twice the channel bandwidth even when it is coupled to a receiving A/D converter that operates under control of a clock that operates at a faster rate than this symbol rate (e.g., at 8 kHz). This modem is realized by synchronizing the modem's operation to the A/D's clock. The modem's output is conditioned by adjusting it to the A/D converter's sampling times and slicing levels so that the quantization noise problem existent in conventional arrangements is avoided. To do this properly, the intersymbol interference should also be minimized.

The intersymbol interference is minimized in one embodiment by forming the modem's output from a collection of analog samples that have a zero value at all but predefined sampling instances of the A/D's sampling clock. In another embodiment the signal created at the modem is preconditioned to take account of the intersymbol interference.

When the A/D's clock is higher than twice the bandwidth of the modem's output signal, some intersymbol interference cannot be avoided. However, in accordance with the principles of this invention, the position and value of this interference is computed at the receiver and subtracted from the received signal.

The synchronizing of the modem's operation to the receiving A/D's clock is accomplished in a number of steps. First, the receiving A/D converter's clock is detected, then its phase is ascertained, thereafter the A/D converter's slicing levels are ascertained, and finally the transmission medium's transfer characteristics are equalized.

DETAILED DESCRIPTION

Figure 1:
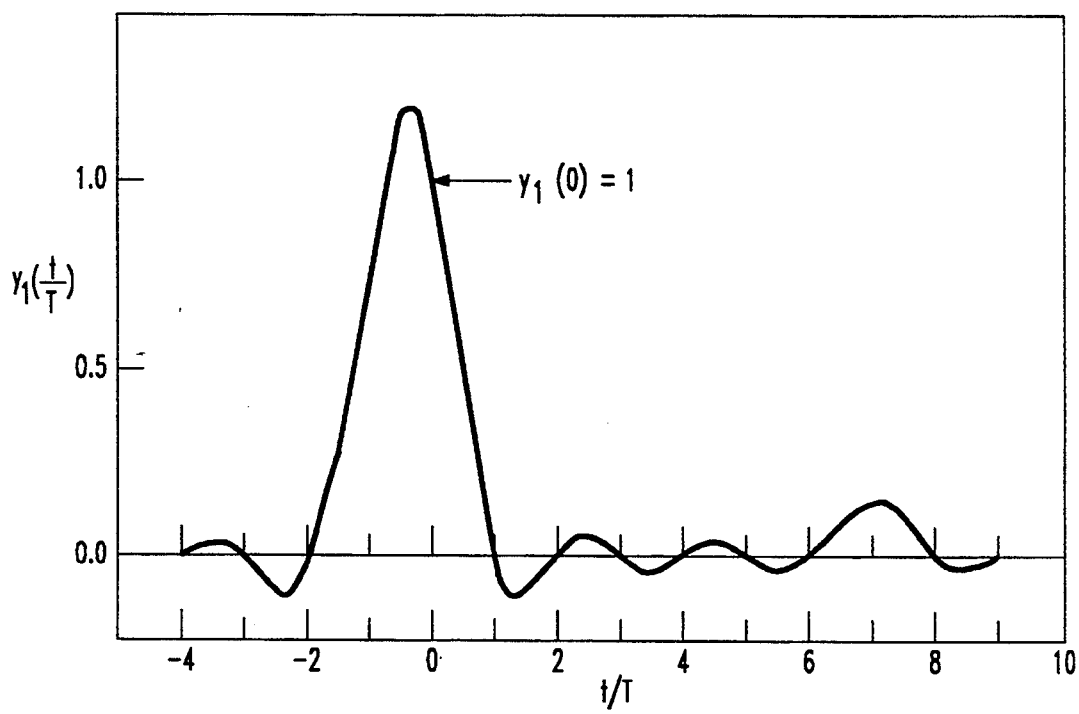
FIGS. 1 and 2 present two analog sample waveforms that may be employed in a modem structured in accordance with this invention.

There are three major obstacles to the coupling of the A/D converter (in the channel bank) to the analog signal that is developed in a modem's D/A converter (in response to an applied digital signal). The first is rooted in the fact that the modem has no knowledge of the timing of the sampling instants or the slicing levels at the channel bank. The second lies in the fact that there is a bandpass filter bandlimited to approximately 250 Hz–3500 Hz between the modem's D/A converter and the channel bank's A/D converter. The third lies in the unknown loss and distortion of the subscriber line between the modem and the channel bank.

In accordance with the principles of this invention an approach is taken which assumes that it is possible (e.g., through a start-up sequence) to learn the exact slicing levels of the channel bank's A/D converter, the channel bank's sampling clock instants, and also the loss and distortion properties of the subscriber line, and the channel bank circuitry. If it were not for the bandpass filter, following the principles of this invention by coupling of the modem's D/A converter to the channel bank's clock, and combining this action with appropriate selection of signals to be sent by the modem (as described in detail below), yields a data rate of up to 56 kb/s, even possibly 64 kb/s if signaling and line conditioning bits in PCM transmission are not used.

Stated in other words, when the effects of the bandpass filter are ignored, the D/A in the modem and the A/D in the channel bank can be made to appear transparent with respect to the communication of digital information when the D/A converts the digital signal to an analog signal that is sure to be reconverted to the same digital signal by the A/D converter. That means that the A/D converter is not allowed to create any quantization noise, and whatever analog sample is created must be captured by the A/D and converted back to digital form. As indicated above, that requires the A/D to be locked to the D/A. (It may be noted in passing that for the A/D to create no quantization noise, the arriving signal must be such that at the time of sampling it is close enough to the correct slicing level to result in the desired digital signal; i.e., the analog level must be $s \pm \delta$, where s is the analog slicing level and $\delta$ is less than $\frac{1}{2}$ the step size, where $\delta$ may depend on s.)

Alas, the A/D converter in the D channel bank is, in fact, preceded by a bandpass filter bandlimited to 250 Hz–3.5 kHz. For analysis purposes this filter can be thought to be at the output of the modem's D/A, and indeed, one can install such a filter at the modem's output in addition to having such a filter at the input of the channel bank. With a filter at the modem's output, the modem can be thought of as a circuit that develops an analog pulse of the appropriate amplitude (corresponding to the digital signal's value) and that pulse is filtered with a filter bandlimited to 250 Hz–3500 Hz. The filtered analog pulses are combined to form the contiguous analog signal at the modem's output. In the following, the simpler case of a 3.5 kHz lowpass filter to approximate the bandpass filter is described first. Then, the bandpass case is presented.

With a flat baseband of 3.5 kHz, the best analog pulses that the modem can generate are of the form $$\frac{\sin \pi x}{\pi x}$$

(sometimes referred to as sinc x) with nulls spaced by 1/7000 seconds. This means that analog pulses that are generated at a 7 kHz clock can be sampled at that clock rate with no inter-symbol interference, because at the sampling instances the analog signal of previous and subsequent analog pulses are null and their contribution, therefore, is zero.

On the other hand, no analog pulses can be created that are band-limited to 3.5 kHz and which also exhibit nulls in time at an 8 kHz rate (i.e., spaced 125 μsec apart). (Exhibiting nulls at an 8 kHz rate suggests the presence of signals up to 4 kHz and such signals do not exist in the 3.5 kHz band-limited signal.) That means that creating an analog signal from a collection of analog samples that are spaced at an interval corresponding to the period of an 8 kHz clock cannot be accomplished without introducing inter-symbol interference in the created analog signal.

Stated in other words, it is not possible to choose 8000 independent samples per second and pass them through the modem when the modem's output is band-limited to 3.5 kHz.

In accordance with the principles of this invention, however, non-uniform sampling is employed to transmit 7000 independent samples per second—which is possible with a 3.5 kHz low-pass output filter—with a timing that corresponds to an 8 kHz clock. This is accomplished by sending the 7000 independent samples per second in groups of 7 samples in each interval of 8 periods of the 8 kHz clock. Of course, each of the analog samples is of a magnitude that corresponds to the symbol that created the analog sample.

To generalize, in accordance with the principles of this invention, the modem sends analog samples in groups of N analog samples in each interval of M clock periods, where N and M are integers such that $$\frac{N}{M} = 2f_cT,$$

where $f_c$ is the total available bandwidth in the channel and T is the period of the channel bank's A/D converter's clock.

One Realization of a Transmitting Modem

Figure 2:
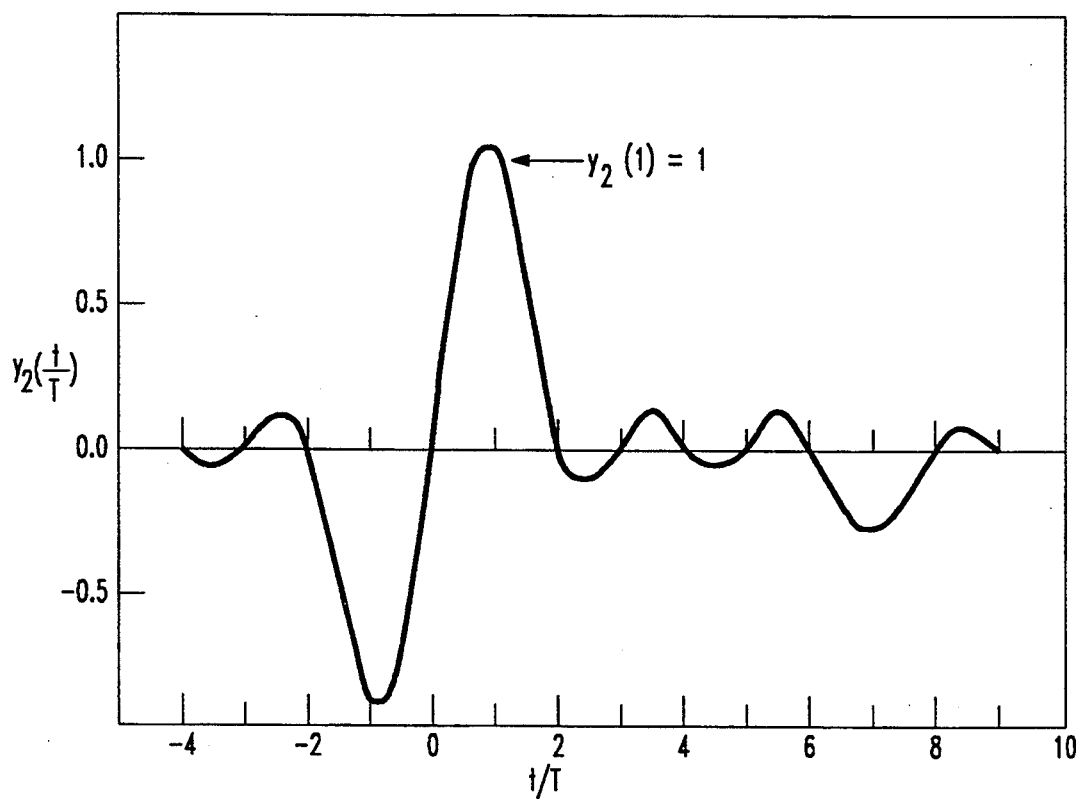

In "On Nonuniform Sampling of Bandwidth-Limited Signals", IRE Transactions on Circuit Theory, December 1956, pp. 251–257, J. L. Yen, demonstrated that Nyquist requirements are not violated merely by sampling a signal more often, as long as the average sampling frequency is within the Nyquist bounds. Indeed, he demonstrated that nonuniform sampling can be a recurrent nonuniform sampling, and inter-symbol interference can be avoided by employing a collection of particularly constructed analog samples. This collection of band limited signals, $y_p$, can take the form $$y_p(t) = K_p \text{sinc} \frac{t - t_p}{8T} \prod_{\substack{q=1 \\ q \neq p}}^{7} \sin \frac{\pi(t - t_q)}{8T}$$

where p = 1, 2, ... 7 and $K_p$ is a constant. The product of sine functions in the above equation is composed of sine functions that have a period 16 T, which means that at every 8th sampling instant the function has the value zero. Since each of the functions in the product is offset by $t_q$, it follows that the product has the value zero seven times in an 8 T interval, corresponding to the seven sine functions. This 6-out-of-8-zeros product function modulates the "sinc" function to yield a collection of six different analog pulses $y_p$ that have a non-zero value at the same one clock instant. FIGS. 1 and 2 depict two of these functions for purposes of illustration (the instant where the two depicted pulses are nonzero is at clock 7).

Figure 3:
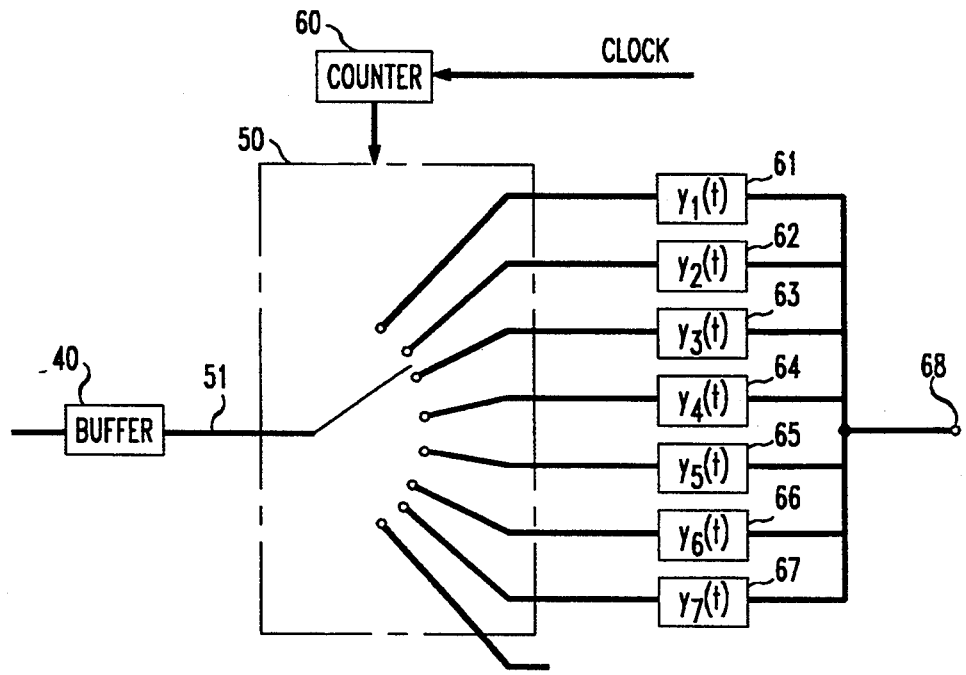
FIG. 3 presents the structure for advantageously utilizing the FIGS. 1 and 2 waveforms.

The above-defined $y_p$ signals form the set of analog samples that are combined (after proper modification of their amplitudes in accordance with the incoming symbols) to form the analog output of the modem, as depicted in FIG. 3.

In FIG. 3, analog samples of an amplitude corresponding to the symbols to be transmitted are applied to switch 50. Switch 50 is a conventional analog (e.g. linear MOS) switch that connects an input lead to one of 8 output leads. Switch 50 is under control of a 3-bit counter 60 that is driven by channel bank's clock. As an aside, the manner by which the channel bank clock is obtained by the FIG. 3 circuit is unimportant to the circuit's operation but, of course, in this application that is a concern. This concern is addressed below. Also, it should be kept in mind that some of the parameters in the FIG. 3 circuit are related directly to the numerical parameters employed in the specific application described herein. For instance, switch 50 has 8 outputs in direct consequence of the fact that an 8 kHz channel bank clock is assumed (giving a Nyquist band of 4 kHz) and the low-pass filter is 3.5 kHz wide. This results in a ratio of 7:8.

Returning to FIG. 3, seven out of the eight outputs of switch 50 are connected to filters 61–67. Each of the filters possesses one of the $y_p$ impulse responses, and the outputs of the filters are combined to form the output. Filters $y_p$'s can be constructed in any of a number of conventional ways, such as with FIR filters.

The eighth output of switch 50 is not connected. However, counter 60 is cycled through all of its 8 states, resulting in the condition that during one out of every eight clock periods the input on line 51 is not coupled to terminal 68. Buffer 40 is interposed ahead of line 51 to account for the uneven transmission of signals to filters 61–67. Thus, the input to buffer 40 supplies samples at a 7000 Hz rate, while the output of buffer 40 is at an 8000 Hz rate, with one out of every 8 clocks not delivering any data out of the buffer. Such data rate converters are fairly conventional so their design is not elaborated herein.

The above describes one realization of a transmitting modem where the set of analog samples $y_p$ is designed for a particular band of a baseband signal. It is also possible to design a collection of analog samples for a bandpass signal. For example, if the bandpass signal is symmetrically situated in the 0 to 4000 Hz band, such as between 500 Hz and 3500 Hz, there would be a collection of six analog samples $y_p$, with each crossing zero at six instances of an 8 clock period interval, corresponding to the passage of 6000 independent samples with each collection of 8000 clocks. These analog samples may take the form:

$$y_p(t) = K_p \text{sinc}\left(\frac{t - t_p}{8T}\right)\cos\frac{\pi t}{2T} \prod_{\substack{q=1 \\ q \neq p \\ q \text{ even}}}^{5} \sin\pi(t - t_q),$$

for $p = 1, 3, 5,$ and

-continued $$y_p(t) = K_p \text{sinc}\left(\frac{t - t_p}{8T}\right)\sin\frac{\pi t}{2T} \prod_{\substack{q=2 \\ q \neq p \\ q \text{ odd}}}^{6} \sin\frac{\pi(t - t_q)}{8T},$$

for $p = 2, 4, 6$.

Another Realization of a Transmitting Modem

When a pulse of unit value is applied to a time discrete transversal filter, the output is a collection of pulses that define the filter's impulse response, $h_k$, where k is the sample instant index. In response to an applied sequence of pulses x, the filter's output r at sample instant k is $$r_k = \sum_{j \geq 0} h_j x_{k-j}.$$

The value contributed by $h_j$ when j is not equal to 0 is, in effect, the intersymbol interference.

In accordance with this invention, it is desired to send a signal that, at the output of the channel bank's low-pass filter creates levels that are exactly at the slicing levels of the channel bank's A/D converter. In accordance with the above and because of the intersymbol interference, signals $x_k$ should be sent to the channel bank rather than the slicing level signals $s_k$, where $x_k$ is related to $s_k$ by $$x_k = \frac{1}{h_o}\left(s_k - \sum_{j \geq 1} h_j x_{k-j}\right).$$

This relationship can be realized by applying the output of a circuit to a filter $h_n - \delta_n$, where $\delta_n - 1$ for $n = 0$ and $\delta_n = 0$ otherwise, and subtracting the output of the filter from the input to form the circuit's output. Such an arrangement is depicted in FIG. 4.

Figure 4:
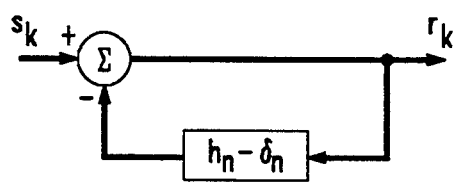
FIG. 4 depicts a filter arrangement.

In the frequency domain, the FIG. 4 circuit has the response $$X(\omega) = \frac{S(\omega)}{H(\omega)}.$$

That means that if signal s has a non-zero signal at a frequency where H is zero, the above becomes unbounded. Stated in other words, the circuit of FIG. 4 becomes unstable when the signal applied to the filter contains frequencies outside its passband.

Figure 5:
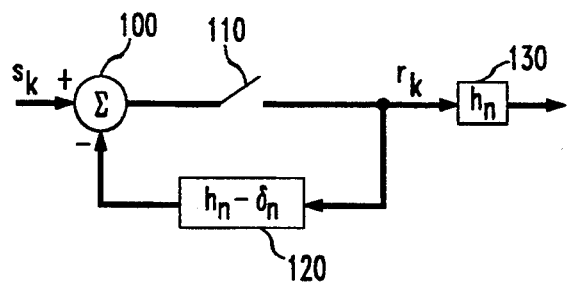
FIG. 5 presents a novel augmentation of the FIG. 4 filter arrangement that, in accord with the principles of this invention allows passing information through the filter at a burst rate that is higher than twice the bandwidth of the filter.

This potential instability is eliminated in accordance with the principles of this invention by including a switch in the feedback loop as illustrated, for example, in FIG. 5. Specifically, the input signal is applied in FIG. 5 to the positive input of subtractor 100, the output signal of subtractor 100 is applied to a switch 110, and the output of switch 110 is applied to discrete time transversal filter 120 having the impulse response $h_n - \delta_n$. The output of filter 120 is applied to the negative input of subtractor 100.

The output of switch 110 is a sequence of samples such that when passed through filter $h_n$ results in exactly the correct levels, sans the inter-symbol interference. As indicated earlier, this filter corresponds to the waveshape in the sample-hold followed by the output filter of the modem followed by the filtering action of the transmission medium and followed still by the input filter the channel bank. In FIG. 5 it is represented by filter block 130.

Figure 6:
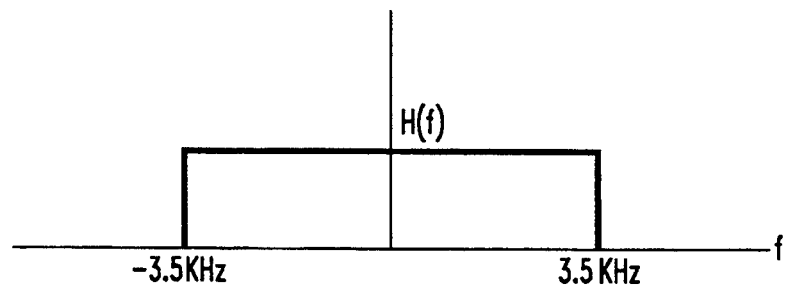
FIG. 6 is a frequency domain image of a 3.5 kHz band limited signal.
Figure 7:
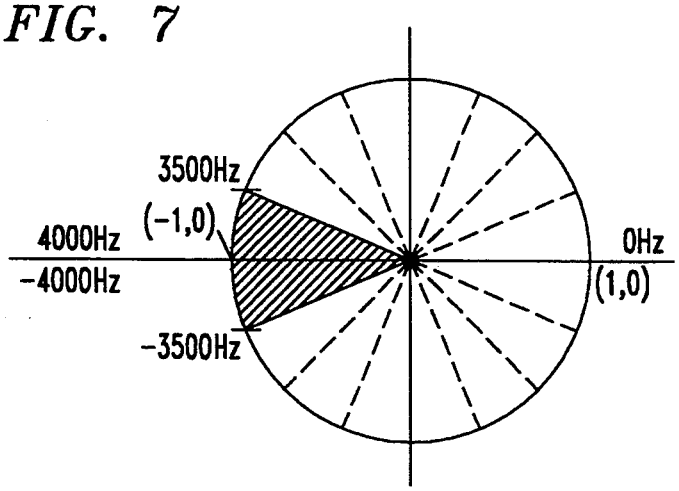
FIG. 7 is a z-domain equivalent of the FIG. 6 signal, demonstrating the switching pattern needed for the switch of FIG. 5.

FIG. 6 depicts a spectrum of an analog (baseband) signal that is band-limited to 3.5 kHz. When that signal is sampled, it maps onto the unit circle of the well-known z-transform shown in FIG. 7 (assuming a 8 kHz sampling clock). In FIG. 7, coordinate (1,0) corresponds to zero frequency and coordinate (−1,0) corresponds to frequencies 4000 Hz and −4000 Hz. The band-limited nature of the FIG. 6 spectrum is indicated by the forbidden region shown as the shaded sector in FIG. 7, centered about the (−1,0) coordinate.

It can be shown that the FIG. 5 circuit is stable when switch 110 is opened in a regular pattern. The pattern of switch openings can be ascertained by starting at (1,0), progressing counter clockwise (i.e., up in frequency), and dividing the encountered region in the upper half of the circle—in this case an unshaded region—into small identical sectors such that the subsequent regions in the upper half of the circle (the shaded as well as the unshaded regions) are encompassed in identifiable small sectors. In the case of FIG. 7, there can be 8 sectors: seven in the unshaded region and one in the shaded region. Going around the complete circle, this leads to the sequence 1111111001111111, followed by other sequences 1111111001111111. Since there fourteen 1's followed by two 0's, pairing the members of the sequence reduces the basic sequence to seven 1's followed by one 0. This means 7 periods T with switch 110 (of FIG. 5) closed, followed by one period T with switch 110 open. This comports with the 7:8 ratio discussed above.

Figure 8:
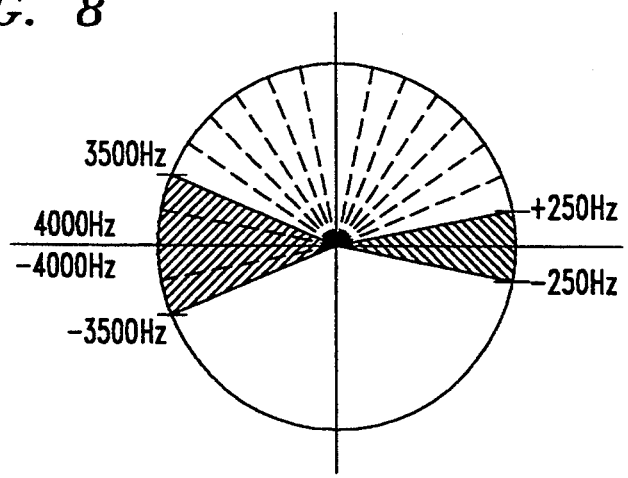
FIG. 8 is a z-domain representation of a bandpass signal, demonstrating an switching altered pattern for the switch of FIG. 5.

FIG. 8 presents a generalization of the above teachings to a bandpass (rather than a low-pass) case. This generalization is important because, in some practical applications, in particular that of the 50 kb/s modem, block 130 is a bandpass element and not a low-pass element. In FIG. 8 it is assumed that the bandpass frequencies range between 250 Hz and 3500 Hz.

In accordance with the above teachings, the FIG. 8 circle is divided into sectors that yield the (full circle) sequence: 0111111111111100001111111111110. In this case, there are thirteen 1's interposed between zeros, and those cannot be paired (or otherwise combined) since the number 13 has no common factors with the number of 0's (which is 2 in one sequence and 4 in the other).

The Receiving Modem

Figure 9:
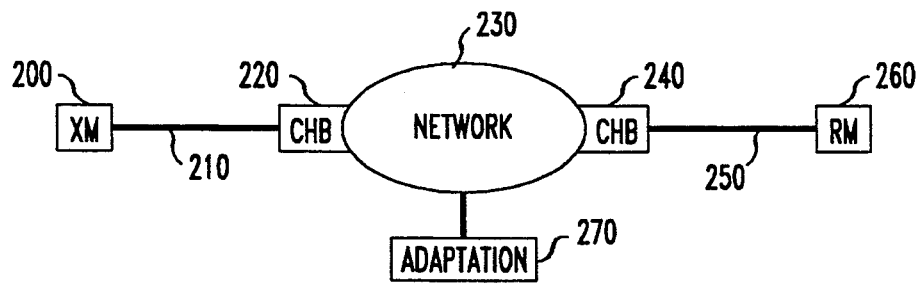
FIG. 9 illustrates the end-to-end arrangement employing the modem of this invention and points to the need for intersymbol interference correction at the receiving modem.

FIG. 9 presents the end-to-end connection between a transmitting terminal and its destination. The transmitting terminal develops a digital signal that is applied to transmitting modem 200, the modem sends its analog output signal over transmission medium 210, the analog signal is received in channel bank input circuitry 220 (A/D converter), the digital signal developed by the channel bank is communicated over network 230 to an output block 240 of perhaps another channel bank (D/A converter). Block 240 develops an analog signal that is applied to transmission medium 250, and lastly, a receiver modem 260 accepts the signal provided by medium 250 and converts that signal to a digital stream that, hopefully, is identical to the digital stream applied to transmitting modem 200.

In accordance with this invention as taught above for the lowpass case described above, modem 200 develops an analog output signal such that, for 7 sampling periods in each set of 8 sampling periods, the A/D converter in element 220 receives analog levels which are precisely at the A/D's slicing levels at the time of sampling. For the eighth sampling period, the analog value is not necessarily at the slicing level. For the bandpass case, the switching is different.

Alas, that presents a problem because the signal developed by the D/A converter in element 240 does not faithfully reproduce the analog signal at the input of element 220. This results from of the quantization noise that is introduced by the M-N samples $x_k$ corresponding to the unsent samples $s_k$ in every set of M samples which are not precisely at a slicing level.

Figure 10:
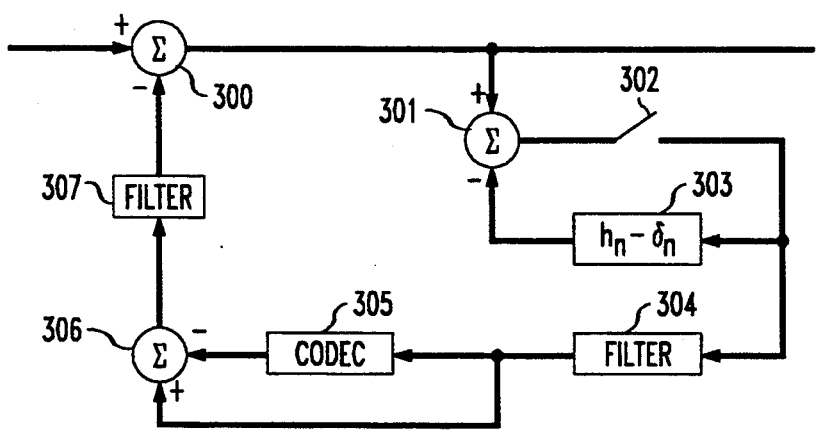
FIG. 10 presents a block diagram of a portion of a receiving modem.

FIG. 10 presents a block diagram of a receiving modem that overcomes this impediment. In FIG. 10, the input signal is applied to subtractor element 300, and the output of subtractor element 300 is applied to the combination of elements 301–303, which duplicates the FIG. 5 transmitting modem circuit. That is, element 301 is a subtractor which receives the output of subtractor 300, the output of subtractor 301 is applied to switch 302, and the output of switch 302 is applied to filter 303. Filter 303, which is identical to filter 120 of the transmitting modem, applies its output to the negative input of subtractor 301. The output of switch 302 is also applied to filter block 304 which is designed to emulate filter 130 of the transmitter. Coefficients $h_n$ are sent by the transmitting modem 200 to the receiving modem 260 during the start-up sequence.

If it is assumed that the output of subtractor 300 is a symbol stream that is identical to the symbol stream applied to the transmitter modem's subtractor 100, then the output of filter block 303 corresponds to the samples that hit the A/D converter in element 220.

Codec block 305 is an element formed from a concatenation of an A/D converter such as the one in block 220 and a D/A converter such as the one in block 240. Applying the output of filter block 304 to block 305 yields a signal out of block 305 that corresponds to a replica of the signal applied to block 305 as corrupted by the quantization noise. Subtracting the output of filter block 304 from the output of codec 305 in subtractor 306, duplicates the quantization noise developed at the output of block 240. Since the quantization noise developed in block 240 is filtered as it passes through medium 250 and is further filtered at the input of receiving modem 260, the output of subtractor 306 is applied in FIG. 10 to filter 307 which simulates the filtering action experienced by the signal developed by elements 240, 250 and 260. The output of filter 307 is then subtracted from the input applied to subtractor 300 to yield an output signal which corresponds to the symbol stream applied to summing circuit 100 in FIG. 5. This signal is then decoded in accordance with conventional techniques.

Training

Figure 11:
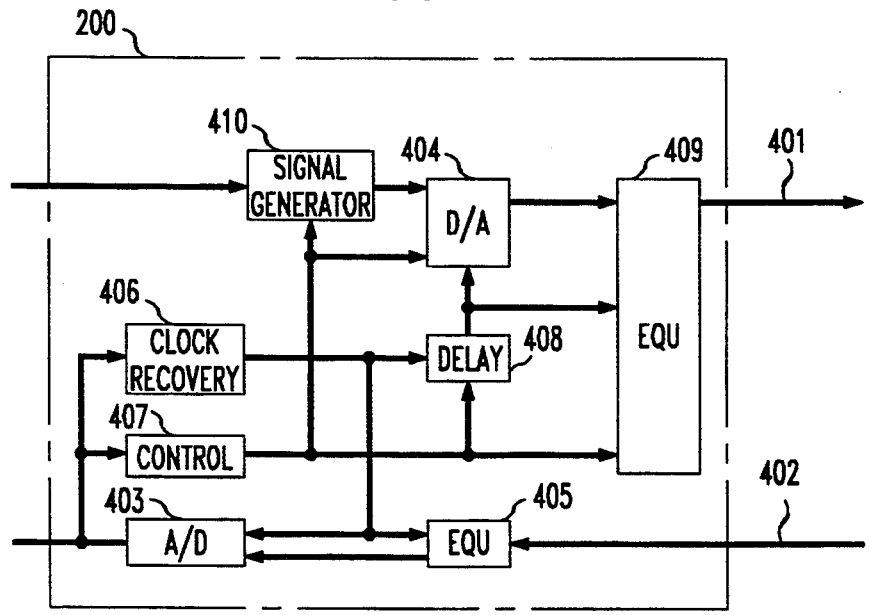
FIG. 11 depicts elements in the transmitting modem and in the channel bank that participate in the synchronization and equalization processes.

One basic requirement of this invention is for the communicating modems to be locked in both frequency and phase to the clock of the network's A/D converter with which they interact. Another is for the modems' transmitted levels to be locked to the receiving A/Ds' slicing levels. There is no requirement, however, that the receiving A/D must be part of a channel bank, although it is there where a substantial commercial applicability exists for the present invention. In viewing the arrangement of FIG. 9, it is noted that locking of the modem to the network's A/D clocks can be accomplished solely under control of the modem that originates the call, e.g., modem 200. That is, modem 200 may specify a connection to modem 260 and, upon connection, modem 260 can place itself in a loop-back mode. Modem 200 can then send a training sequence that passes through elements 210, 220, 230, 240, 250 and arrives at modem 260. That sequence is then returned to modem 200 through elements 250–210. Of course, it is expected that the returning sequence will be greatly adulterated by noise. That is, the mismatch between the signals arriving at the A/D converter in element 220 (from modem 200) and the mismatch between the signals arriving at the A/D converter in element 240 (from modem 260) will cause the signal received by modem 200 to be different from that which it sent. Means within modem 200 (to be described in connection with FIG. 11) are employed to change the signal levels sent by modem 200, to synchronize on the clock of the incoming signal, and to change the phase of the received incoming clock signal; all with the aim of improving the fidelity of the received signal.

One advantage of this approach is that a single modem, i.e., the originating modem, initiates control of the entire synchronization process. One disadvantage of this approach is that, under control of the originating modem, a separate synchronization process must be carried out for modem 260. Another, and perhaps a more troubling disadvantage, is the need to equalize the connection between modem 200 and element 220 while passing signals through the unequalized connection between element 240 and modem 260 and between modem 260 and elements 240 and 220 back to modem 200.

An alternative approach causes modem 260 to enter a training mode upon connection (rather than a loop-back mode), whereupon modem 260 sends a known training sequence to modem 200; while modem 200 sends a known training sequence to modem 260. In accordance with this approach, the two signal paths (modem 200 transmitting to modem 260 and modem 260 transmitting to modem 200) are trained simultaneously. Simultaneous training of the two paths has the advantage that each path contains fewer sources of error.

An even further advantage is derived from a training approach that subdivides the problem into four segments: separately training the path from modem 200 to element 220, the path from element 240 to modem 260, the path from modem 260 to element 240, and the path from element 220 to modem 200. This training approach can best be employed at first hook-up of the modems to the network. Thereafter, the conventional adaptive equalization approach can be undertaken.

In accordance with this four segment approach, which is a network-assisted approach, when a modem is connected to the network, a connection is first established between the modem and a predetermined adaptation resource; e.g., the number 1-900-EQUALIZE. This is depicted in FIG. 9, where network 230 has "ADAPTATION" block 270 connected thereto. Block 270 represents the resource for assisting in adapting a plurality of modems.

In addition, if needed, it is possible to follow this procedure for each call without dialing a special number as above as the network 230 can be arranged to recognize that a modem call is being established by virtue of the calling party's ID and the call can automatically be routed to the equalization source.

When a modem such as modem 200 is connected to block 270, a predetermined digital signal is first sent to the modem by block 270. In accordance with FIG. 11, this signal is received on line 402 by equalization element 405, which includes control circuitry and an equalization filter. The control circuit within element 405 detects the intersymbol interference in the incoming signal, and adapts the equalization filter to minimize this interference. In addition, it provides overall gain control.

The signal applied by block 270 contains all of the possible levels that the A/D converter 403 must be responsive to. Hence, after equalization of element 405, the incoming signal is used to adapt A/D converter 403 (also through an internal control block) to match the incoming analog levels.

Simultaneously, the output of A/D converter 403 is applied to clock recovery circuit 406, which recovers the clock of the incoming signal (i.e. the clock of the D/A converter in element 220). This recovered clock is applied to A/D converter 403, delay element 408, and equalizer 405. Elements 405, 403, and 406 are conventional elements, well known in the art of modem technology.

Once the receiving portion of modem 200 has been adapted to the network, the transmitting portion is adapted. The need is to synchronize the modem's transmitting portion to the network clock—both in frequency and phase—, to generate the correct amplitudes so that the quantization error will not appear at the output of the A/D converter within element 220, and to predistort the transmitted output signals so that it reaches element 220 without intersymbol interference.

The general approach for training of the modem's transmitting portion is to transmit a signal to block 270, to have block 270 analyze the received signal, and in turn, to have block 270 send control information to the modem, to instruct the modem on how to change its operating parameters.

In accordance with this approach, element 407 detects a training initiation signal from block 270, and in response thereto, instructs it to cause signal generator 410 to deliver a particular signal to D/A 404. That signal is converted in block 404, conditioned in block 409, and is transmitted to block 270. Based on the signal received at block 270, another control signal is sent to element 407, directing it to adjust delay element 408. Delay element 408 adjusts the phase of the clock within element 200 to bring it in proper phase with the network clock in element 220. Once the delay is set at the proper level, adjustments are made within D/A converter 404, also under control of signals delivered by element 407, to match the output levels (as they arrive at the A/D converter in element 220) to minimize quantization error. Lastly, again under control of element 407, equalization circuit 409 is adapted to predistort the output signal so that after transmission over line 210 to element 220, the intersymbol interference as seen at element 220 is minimized.

As with elements 403, 405, and 406, elements 408, 404, 409 and 410 are well known and described in numerous publications; for example, "The Theory and Practice of Modem Design", John A. C. Bingham, John Wiley & Sons, New York, 1988. Element 407 is a logic device that merely generates the control signal necessary for controlling elements 408, 404, 410 and 409. The exact nature of the control signals is, of course, a function of the specific design of those elements. Whatever requirements are placed by those elements, control element 407 can generate them in response to input signals received from block 270 via line 210 and elements 405 and 403. Control element 407 can be implemented with a conventional microprocessor.

Finally, when modem 200 is fully equalized, and modem 260 is fully equalized (simultaneously with modem 200), block 270 may be disconnected and modems 200 and 260 connected to each other.

We claim:

1. Apparatus comprising:
    first means for developing a clock signal of period T seconds; and
    second means, responsive to the first means, for developing an output signal of the apparatus, which output signal is band-limited to frequencies below $f_c$ and contains information-bearing analog pulses, at least some of which are spaced T seconds apart;
    wherein T is less than $\frac{1}{2} f_c$,
    wherein each of the information-bearing analog pulses represents a magnitude that corresponds to an applied symbol from a constellation of symbols,
    wherein in each set of M consecutive clock periods T there is a grouping of N of said analog samples, where M and N are integers and N is less than M, and
    wherein said second means comprises N analog pulse generation means with their outputs combined, and each one of the analog samples in the grouping of N of said analog samples is generated by a different one of the N analog pulse generation means.

2. The apparatus of claim 1 wherein at least one of the analog pulse generation means is a filter.

3. The apparatus of claim 1 wherein said second means comprises
    N analog pulse generation means, responsive to applied symbols, that contribute to the output signal of the apparatus, and
    switch means for applying symbols to the N analog pulse generation means to cause each one of the analog samples in the grouping of N of said analog samples to be generated by a different one of the analog pulse generation means, resulting thereby in each one of the analog pulse generation means to be associated with a particular clock period in the set of M consecutive clock periods T.

4. The apparatus of claim 3 wherein the symbols are applied to the second means at intervals mT, where m is an integer greater than 0.

5. The apparatus of claim 3 further comprising a buffer for receiving symbols at rate 2 $f_c$ and outputting symbols to the second means at intervals mT, where m is an integer greater than 0.

6. The apparatus of claim 3 wherein each of the analog pulse generation means is characterized by a transfer function that develops essentially no output when the other of the N analog samples develop a peak output out of their respective analog pulse generation means.

7. The apparatus of claim 3 wherein each of the analog pulse generation means is characterized by a transfer function $$y_p(t) = K_p \text{sinc} \frac{t - t_p}{8T_s} \prod_{\substack{q=1 \\ q \neq p}}^{7} \sin \frac{\pi(t - t_q)}{8T_s}$$

where p is an index integer, $K_p$ is a constant (and there are p such constants), $t_p$ is the $p^{th}$ sampling interval, $T_s$ is the sampling period, $t_q$ is the $q^{th}$ sampling interval where q is another integer index ranging from one to seven, and $y_p$ is the $p^{th}$ signal sample.

8. The apparatus of claim 1, wherein the first means further comprising control means responsive to signals from a remote system to develop said clock signal, which control means includes delay means for changing the phase of the developed clock in response to a training signal applied to said remote system.

9. The apparatus claim 8 wherein said control means affects magnitudes of the symbols applied to the second means.

10. The apparatus claim 8 wherein said control means affects magnitudes of the information-bearing analog pulses developed by the second means.

11. Apparatus comprising:
    an D/A converter operating under control of a first clock, for communicating signals to a A/D converter having a second clock,
    control means for receiving information from the A/D converter,
    means, responsive to said control means, for synchronizing the first clock to the second clock, and
    means, responsive to said control means, for adjusting levels of the output signal of the D/A converter.

12. Apparatus comprising:
    an A/D converter operating under control of a first clock, for receiving signals from a D/A converter having a second clock,
    control means for deriving information from the signal received by the A/D converter,
    means, responsive to said control means, for synchronizing the first clock to the second clock, and
    means, responsive to said control means, for adjusting the slicing levels of the A/D converter.

13. An arrangement for communicating digital information comprising a digital-to-analog conversion means, a analog-to-digital conversion means operating with a clock, and an analog medium coupling the output of the digital-to-analog conversion means with the input of the analog-to-digital conversion means, CHARACTERIZED IN THAT:
    the digital-to-analog conversion means develops an analog output in synchronism with said clock at levels that are cognizant of slicing levels of the analog-to-digital conversion means, and of said analog medium.

14. The arrangement of claim 13 said analog output is of such a magnitude that when the analog output signal is communicated to the analog-to-digital conversion means, the analog-to-digital conversion means develops a digital output that is the same as the applied digital signal.

15. An modem including a transmitting section for developing an analog signal in response to an applied digital stream, which analog signal is destined to a remote clocked conversion means, a receiving section for developing a digital string in response to an analog signal from the remote clocked conversion means, means for developing a clock in synchronism with the clock in the remote conversion means, and means for employing the developed clock in the transmitting section, the receiving section comprising:
- a switched filter,
- a transmission-medium-emulating filter responsive the output of the switched filter,
- a codec connected to the output of the transmission-medium-emulating filter,
- a combiner for subtracting the output of the codec from the output of the transmission-medium-emulating filter,
- a band limiting filter responsive to an output signal of the combiner, and
- an input subtracter, for subtracting the output of the band limiting filter from incoming signals to form a symbol signal, the symbol signal being applied to the switched filter and to A/D means for developing said digital string.

16. A method for modifying operational parameters of a modem connected to a digital channel bank via analog lines, where the modem has a receiving portion and a transmitting portion, the method comprising the steps of:
- connecting the modem, through the channel bank, to a predefined destination, which connecting is effected over digital facilities following the channel bank, having communication and signal processing capabilities,
- the modem receiving a known signal, through the digital facilities through the channel bank, from the predefined destination,
- the modem processing the received signal to develop first control signals for the receiving portion and second control signals for the transmitting portion,
- the modem equalizing the receiving portion in response to the first control signals developed by the step of processing, and
- the modem equalizing the transmitting portion in response to the second control signals developed by the step of processing.

* * * * *